(12) United States Patent
Smith (10) Patent No.: US 9,818,013 B2
(45) Date of Patent: *Nov. 14, 2017

(54) MOBILE COMPUTER CONFIGURED TO READ MULTIPLE DECODABLE INDICIA

(71) Applicant: Hand Held Products, Inc., Fort Mill, SC (US)

(72) Inventor: Taylor Smith, Charlotte, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/956,538

(22) Filed: Dec. 2, 2015

(65) Prior Publication Data

US 2016/0086008 A1    Mar. 24, 2016

Related U.S. Application Data

(63) Continuation of application No. 13/748,926, filed on Jan. 24, 2013, now Pat. No. 9,208,367.

(60) Provisional application No. 61/726,747, filed on Nov. 15, 2012.

(51) Int. Cl.
*G06K 7/10* (2006.01)
*G06K 7/14* (2006.01)

(52) U.S. Cl.
CPC ....... *G06K 7/1443* (2013.01); *G06K 7/10881* (2013.01); *G06K 7/1404* (2013.01); *G06K 7/1417* (2013.01)

(58) Field of Classification Search
USPC ................ 235/454, 462.01, 462.09, 462.25
See application file for complete search history.

(56) References Cited

U.S. PATENT DOCUMENTS

| | | | |
|---|---|---|---|
| 5,428,212 A | 6/1995 | Tani et al. | |
| 5,821,523 A | 10/1998 | Bunte et al. | |
| 6,758,403 B1 | 7/2004 | Keys et al. | |
| 7,628,318 B2 | 12/2009 | Melick et al. | |
| 7,798,417 B2 | 9/2010 | Snyder et al. | |
| 8,326,754 B2 | 12/2012 | Bandych et al. | |
| 9,208,367 B2 * | 12/2015 | Smith .................. | G06K 7/1404 |

(Continued)

OTHER PUBLICATIONS

Office Action in counterpart European Application No. 13192219.7 dated Jan. 21, 2016, pp. 1-5.

(Continued)

*Primary Examiner* — Ahshik Kim
(74) *Attorney, Agent, or Firm* — Additon, Higgins & Pendleton, P.A.

(57) ABSTRACT

A device can comprise a processor, a memory, an imaging subsystem configured to acquire an image of decodable indicia, a display, and a communication interface. The device can be configured, responsive to acquiring an image of one or more objects within a field of view of the imaging subsystem, to locate within the image and decode one or more decodable indicia. The device can be further configured to display the image on the display and visually mark the one or more successfully decoded decodable indicia. The device can be further configured, responsive to accepting user input selecting at least one decodable indicia of the displayed one or more decodable indicia, to transmit to an external computer at least one decoded message corresponding to the at least one decodable indicia.

20 Claims, 4 Drawing Sheets

(56) References Cited

U.S. PATENT DOCUMENTS

| | | |
|---|---|---|
| 2005/0279832 A1 | 12/2005 | Kobayashi et al. |
| 2006/0113389 A1 | 6/2006 | Barkan |
| 2006/0163356 A1 | 7/2006 | Shigekusa |
| 2007/0210155 A1 | 9/2007 | Swartz et al. |
| 2009/0078774 A1 | 3/2009 | He |
| 2010/0332385 A1 | 12/2010 | Mersky |
| 2011/0040649 A1 | 2/2011 | Dooley et al. |
| 2011/0093344 A1 | 4/2011 | Burke et al. |
| 2011/0189647 A1 | 8/2011 | Radtke et al. |
| 2011/0212751 A1 | 9/2011 | Haven et al. |

OTHER PUBLICATIONS

Search Report in counterpart European Application No. 13192219.7 dated Dec. 21, 2015, pp. 1-5.
English-translation of Office Action in counterpart Chinese Application No. 201320897436.6 dated Mar. 5, 2014, pp. 1-2.
English-translation of Notification to Make Rectification in counterpart Chinese Application No. 201320897436.6 dated Aug. 1, 2014, pp. 1-2.
English-translation of Notification of Grant in counterpart Chinese Application No. 201320897436.6 dated Oct. 24, 2014, pp. 1.

\* cited by examiner

MOBILE COMPUTER CONFIGURED TO READ MULTIPLE DECODABLE INDICIA

CROSS-REFERENCE TO RELATED APPLICATIONS

The present application claims the benefit of U.S. patent application Ser. No. 13/748,926 for a Mobile Computer Configured to Read Multiple Decodable Indicia filed Jan. 24, 2013 (and published May 15, 2014 as U.S. Patent Publication No. 2014/0131443), now U.S. Pat. No. 9,208,367, which claims the benefit of U.S. patent application Ser. No. 61/726,747 for a Mobile Computer Configured to Read Multiple Decodable Indicia filed Nov. 15, 2012. Each of the foregoing patent applications, patent publication, and patent is hereby incorporated by reference in its entirety.

FIELD OF THE INVENTION

The present invention relates generally to digital devices, and in particular to mobile computers configured to read decodable indicia.

BACKGROUND

Decodable indicia are patterns, marks, or messages which are designed to be scanned and interpreted by computer and/or other mechanical and/or automated methods. Many known types of decodable indicia fall under the category of barcodes. Barcodes are graphical representations of data, the most common of which are referred to as one dimensional (1D) and two dimensional (2D) barcodes. 1D barcodes are graphical entities that represent data by varying the widths and spacing of parallel lines. 2D barcodes are also graphical entities that represent data, but in addition to the parallel lines, or bars, a 2D barcode may contain rectangles, dots, hexagons and other geometric patterns in two dimensions. The data encoded in the barcodes are interpreted by optical scanners and/or software. Barcodes can be scanned by special optical scanners called barcode readers as well as by general purpose devices such as smart phones. Other types of decodable indicia include optical character recognition (OCR), glyphs, or other visual markings. Also, non-visual technologies such as magnetic strips, radio-frequency identification (RFID), and other non-visual technologies fall under the definition of decodable indicia as well.

The discussion above is merely provided for general background information and is not intended to be used as an aid in determining the scope of the claimed subject matter.

SUMMARY

Systems are disclosed that in various embodiments include devices, methods, and/or software for processing multiple decodable indicia. In one illustrative embodiment, there is provided a device comprising a processor, a memory, an imaging subsystem configured to acquire an image of decodable indicia, a display, and a communication interface. The device can be configured, responsive to acquiring an image of one or more objects within a field of view of the imaging subsystem, to locate within the image and decode one or more decodable indicia. The device can be further configured to display the image on the display and visually mark the one or more successfully decoded decodable indicia. The device can be further configured, responsive to accepting user input selecting at least one decodable indicia of the displayed one or more decodable indicia, to transmit to an external computer at least one decoded message corresponding to the at least one decodable indicia.

In some embodiments, the device can be provided by a smart phone, a tablet computer, or a personal digital assistant.

In some embodiments, the imaging subsystem can comprises a two-dimensional image sensor configured to output an analog signal representative of light reflected by an object located within a field of view of the imaging subsystem, an amplifier configured to output an amplified analog signal by amplifying the analog signal read out of the image sensor, and an analog-to-digital (A/D) converter configured to convert the amplified analog signal into a digital signal representing the acquired image.

In some embodiments, the device can be further configured to accept user input indicating an order in which decoded messages corresponding to two or more decodable indicia should be transmitted to the external computer.

In some embodiments, the device can be further configured to accept user input selecting within the displayed image at least one decodable indicia which is not marked as successfully decoded, and to decode the at least one decodable indicia.

In some embodiments, the device can be further configured, responsive to accepting user input selecting at least one decodable indicia of the displayed one or more decodable indicia, to transmit to an external computer at least one image comprising the at least one decodable indicia.

In another illustrative embodiment, there is provided a method of processing multiple decodable indicia, performed using one or more processors, comprising: acquiring an image of one or more objects bearing one or more decodable indicia, locating one or more decodable indicia within the image, decoding the one or more decodable indicia, displaying the image, visually marking the one or more successfully decoded decodable indicia within the displayed image, accepting user input selecting at least one decodable indicia of the displayed one or more decodable indicia, and transmitting to an external computer at least one decoded message corresponding to the at least one decodable indicia.

In some embodiments, the step of accepting user input comprises accepting user input indicating an order in which decoded messages corresponding to two or more decodable indicia should be transmitted to the external computer.

In some embodiments, the method can further comprise accepting user input selecting within the displayed image at least one decodable indicia which is not marked as successfully decoded, and decoding the selected decodable indicia.

In some embodiments, visually marking the successfully decoded decodable indicia within the displayed image can be performed by highlighting the successfully decoded decodable indicia, rendering a bounding box around the one or more successfully decoded decodable indicia, or rendering a visual marker around a center of the one or more successfully decoded decodable indicia.

In some embodiments, the method can further comprise transmitting to an external computer at least one image comprising at least one decodable indicia selected by a user.

In some embodiments, the method can be performed by one or more processors of one or more mobile computers.

In another illustrative embodiment, there is provided a computer-readable storage medium comprising executable instructions capable of configuring one or more processors for: acquiring an image of one or more objects bearing one or more decodable indicia, locating one or more decodable indicia within the image, decoding the one or more decodable indicia, displaying the image, visually marking the one or more successfully decoded decodable indicia within the displayed image, accepting user input selecting at least one decodable indicia of the displayed one or more decodable indicia, and transmitting to an external computer at least one decoded message corresponding to the at least one decodable indicia.

In some embodiments, the executable instructions can be further capable of configuring one or more processors so that the step of accepting user input comprises accepting user input indicating an order in which decoded messages corresponding to the two or more decodable indicia should be transmitted to the external computer.

In some embodiments, the executable instructions can be further capable of configuring one or more processors for: selecting within the displayed image at least one decodable indicia which is not marked as successfully decoded, and decoding the at least one decodable indicia.

In some embodiments, the executable instructions can be further capable of configuring one or more processors so that the visually marking the successfully decoded decodable indicia within the displayed image can be performed by highlighting the one or more successfully decoded decodable indicia, rendering a bounding box around the one or more successfully decoded decodable indicia, or rendering a visual marker around a center of the one or more successfully decoded decodable indicia.

In some embodiments, the executable instructions can be further capable of configuring one or more processors for transmitting, responsive to accepting user input selecting at least one decodable indicia of the displayed one or more decodable indicia, to an external computer at least one image comprising the at least one decodable indicia.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION

Capturing decodable indicia can be performed using various technologies. Laser scanning or linear imaging can be used for capturing 1D barcodes. Some 2D barcodes known as stacked codes, such as PDF417, can be read using these technologies as well, however 2D bar codes known as matrix codes require devices which can capture a 2 dimensional (2D) image of the bar code. These 2D images are also useful for decoding 1D, 2D stacked codes, as well as OCR or other visual decodable indicia. For RFID tags, magnetic strips or other non-visual decodable indicia, the technologies may involve use of RF, magnetic reading heads, or other non-visual means of capture. For the purposes of this disclosure, capturing any decodable indicia will be referred to generally as "imaging", and the captured representation of the decodable indicia by a device will be referred to as an "image".

Mobile computers, such as smart phones, tablet personal computers (PCs), personal digital assistants (PDA), and other similar devices equipped with imaging devices can be used for reading and/or decoding decodable indicia. "Computer" herein shall refer to a programmable device for data processing and control, including a central processing unit (CPU), a memory, and at least one communication interface.

In situations when two or more decodable indicia are present within a captured image, an additional processing might be needed to determine which indicia and in which order need to be decoded and/or used for a particular application (e.g., for information retrieval from an external computer).

In some embodiments, a mobile computer can, upon locating and decoding two or more decodable indicia within a captured image, display the image and visually mark the decoded indicia within the image (e.g., by highlighting the successfully decoded decodable indicia, drawing a bounding box around the successfully decoded decodable indicia, placing a circular dot or some other visual marker in or around the center of the successfully decoded decodable indicia, etc.). The mobile computer can accept user input indicating which indicia and in which order need to be used by one or more applications. In one illustrative embodiment, responsive to accepting user input selecting one or more decodable indicia, the mobile computer can transmit to an external computer the decoded messages corresponding to the selected indicia. In another illustrative embodiment, responsive to accepting user input selecting two or more decodable indicia, the mobile computer can transmit to an external computer, in the order indicated by the user, the decoded messages corresponding to the selected indicia.

In a further aspect, selecting one or more decodable indicia can be performed via touch screen by the user's tapping the screen areas containing the images of one or more decodable indicia. In one illustrative embodiment, the user's repetitive tapping the screen area containing a decodable indicia image can toggle on or off the inclusion of the indicia and/or a decoded message corresponding to the indicia into the sequence of messages to be transmitted to an external computer.

As noted herein supra, the mobile computer can, upon locating and decoding two or more decodable indicia within a captured image, display the image and visually mark the decoded indicia within the image (e.g., by highlighting the successfully decoded decodable indicia, drawing a bounding box around the successfully decoded decodable indicia, placing a circular dot or some other visual marker in or around the center of the successfully decoded decodable indicia, etc.). The mobile computer can accept user input selecting within the displayed image at least one decodable indicia which is not marked as successfully decoded, and decode the selected decodable indicia.

In some embodiments, a mobile computer can schematically display one or more successfully decoded non-visual decodable indicia (e.g., overlaid over an image acquired by the mobile computer's imaging device) and accept user input indicating which non-visual decodable indicia and in which order need to be decoded and/or used for a particular application (e.g., for information retrieval from an external computer).

Figure 1A:
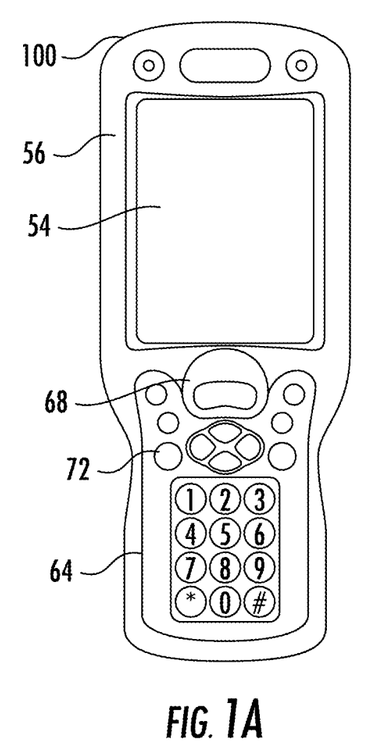
FIGS. 1a-1b schematically illustrate one embodiment of a mobile computer described herein.
Figure 1B:
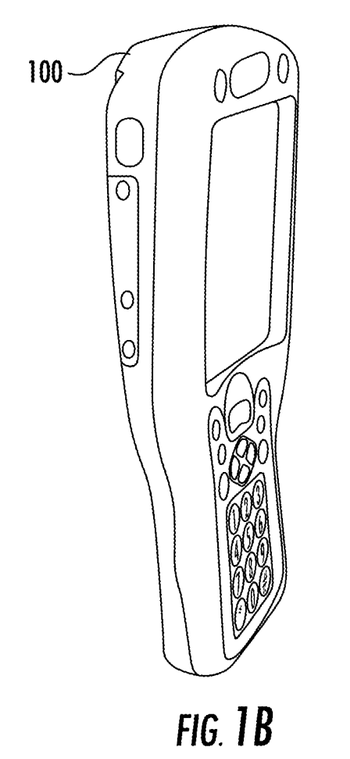

One illustrative embodiment of a mobile computer described herein is shown in FIGS. 1a (front panel view) and 1b (side panel view). The mobile computer 100 can comprise a housing 52 within which other components of mobile computer 100 can be disposed. A display 54 can be disposed on the front panel 56. Also disposed on the front panel 56 can be a keyboard 64 including functional keys 68, navigation keys 72, and/or numeric keys. At least one connector of a wired communication interface can be disposed on the bottom panel or side panel of the housing 52 (e.g., a USB, PCMCIA, Ethernet, or MiniUSB connector). A skilled artisan would appreciate the fact that other form factors of mobile computer 100 are within the scope of this disclosure.

Figure 2:
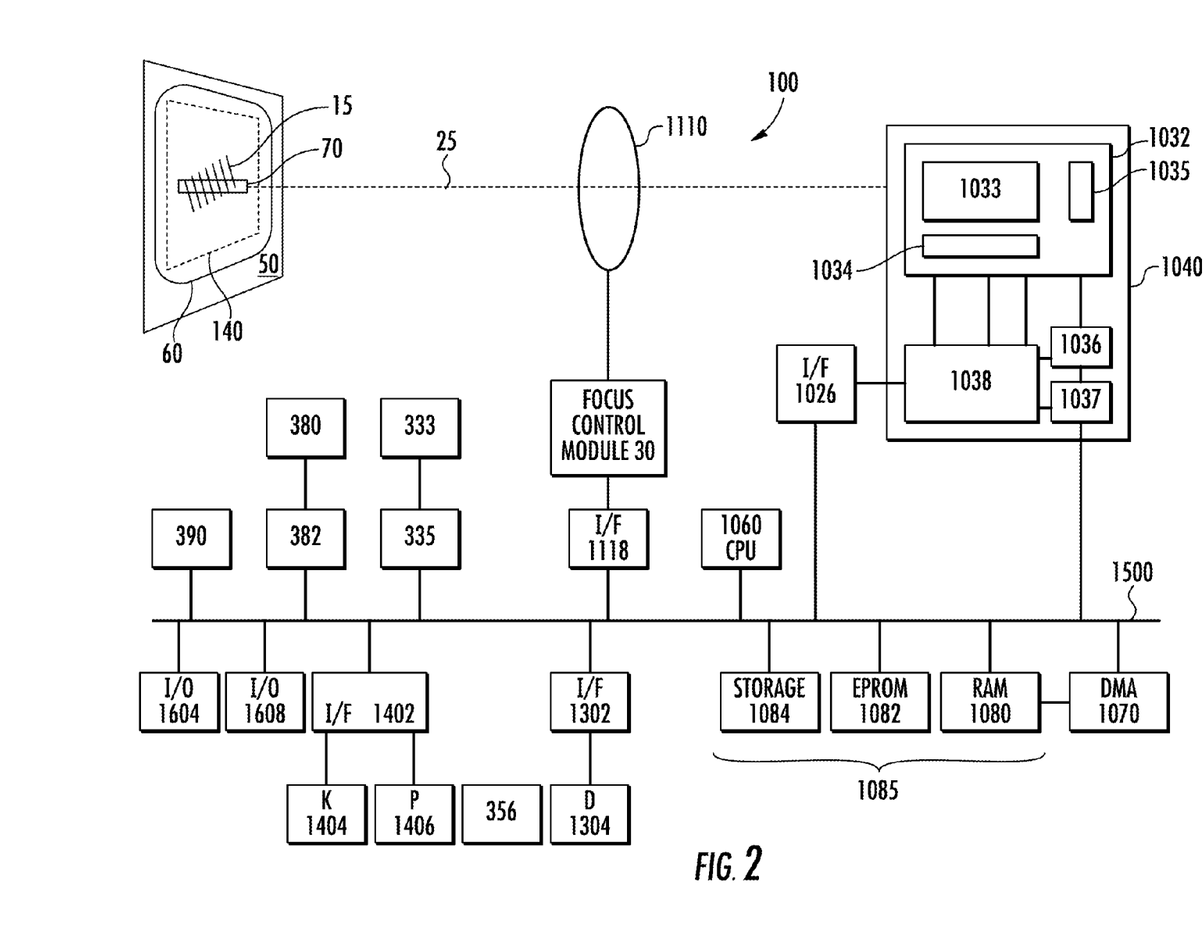
FIG. 2 depicts a component-level diagram of an illustrative embodiment of the mobile computer described herein.

Component-level diagram of an illustrative embodiment of the mobile computer is now being described with references to FIG. 2. Mobile computer 100 can include one or more processors 1060 communicatively coupled to system bus 1500. For example, one or more processors 1060 may illustratively be or include a central processing unit (CPU), a complex programmable logic device (CPLD), an application-specific integrated circuit (ASIC), a field programmable gate array (FPGA), or any type of circuit capable of processing logic operations, in accordance with various embodiments.

Also coupled to system bus 1500 can be various interface circuits for coupling the peripheral devices, including, e.g., interface circuit 1302 for coupling display 1304, and interface circuit 1402 for coupling keyboard 1404 and pointing device 1406 to system bus 1500. In some embodiments, the pointing device can be provided by a touch screen overlay associated with the display 1304.

The mobile computer 100 can further comprise one or more communication interfaces 1604, 1608 for providing communications with external devices. Communication interfaces 1604, 1608 can include one or more wired interfaces (e.g., Ethernet (IEEE 802.3), USB, RS/485, etc.) and one or more wireless interfaces (e.g., interfaces configured to support at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1×EV-DO protocol family).

Also coupled to system bus 1500 can be memory 1085 provided by random access memory (RAM) 1080. In some embodiments, memory 1085 can further comprise a non-volatile memory such as EPROM 1082, and/or a storage memory device 1084. In one embodiment, storage memory device 1084 can be provided by a magnetic disk storage device. Alternatively, storage memory device 1084 can be provided by a semiconductor storage device such as ROM, EPROM, flash memory, and/or any other computer-readable tangible storage device that can store computer programs and digital information.

In some embodiments, mobile computer 100 can further include a direct memory access unit (DMA) 1070 providing direct communications of one or more devices communicatively coupled to system bus 1500 with RAM 1080. Alternatively, mobile computer 100 can employ a system bus providing for bus arbitration mechanism (e.g., a PCI bus) thus eliminating the need for a central DMA controller. Other embodiments of the system bus architecture and/or direct memory access components providing for efficient data transfer between one or more devices communicatively coupled to system bus 1500 and RAM 1080 can be provided.

In a further aspect, mobile computer 100 can include a build-in imaging device 1040 configured to acquire two-dimensional monochrome and/or color images. Imaging device 1040 can comprise an image sensor 1032 including a multiple pixel image sensor 1033 array having pixels arranged in rows and columns, associated column circuitry 1034, and row circuitry 1035. In one embodiment, the image sensor 1033 can be provided by a charge-coupled device (CCD) image sensor. In another embodiment, the image sensor can be provided by a complementary metal-oxide semiconductor (CMOS) image sensor. A skilled artisan would appreciate the fact that other types of image sensors are within the scope of the invention. Associated with the image sensor 1032 can be amplifier circuitry 1036, and an A/D converter 1037 which converts image information in the form of analog signals read out of image sensor 1033 into image information in the form of digital signals. In one embodiment, the A/D converter 1037 can be provided by an A/D array.

Image sensor 1032 can also have an associated timing and control circuit 1038 for use in controlling e.g., the exposure period of image sensor 1032, gain applied to the amplifier circuitry 1036. As noted herein supra, the circuit components 1032, 1036, 1037, and 1038 can be packaged into a common imaging device 1040.

Mobile computer 100 can include interface circuit 1026 for coupling image sensor timing and control circuit 1038 to system bus 1500. Mobile computer 100 can be configured to read out analog signals representative of light incident on one or more pixels. The read out analog signals can be amplified by the analog signal amplifier 1036. The analog signals can then be fed to the input of the ADC 1037. The resulting digital values representative of the analog signals can be stored in a system memory such as RAM 1080. Image frame data stored in RAM 1080 can be in the form of multibit pixel values, with each multibit pixel value representing light incident on a pixel of image sensor 1033. DMA unit 1070 can route image information read out from image sensor 1032 to RAM 1080. In another aspect, processor 1060 can be programmed to read out image data stored in memory 1080 and subject such image data to various image processing algorithms.

In some embodiments, the mobile computer 100 can include a variable focus imaging lens 1110 for use in focusing an image of a decodable indicia located within a field of view 140 on a substrate 50 onto image sensor 1033. Imaging light rays can be transmitted about imaging axis 25. Variable focus imaging lens 1110 can be adapted to be capable of multiple best focus distances and multiple focal lengths. Variable focus imaging lens 1110 can be operative to provide a new best focus distance and/or focal length within a fraction of a frame time in response to an applied input control signal being applied to the variable focus imaging lens 1110. In one embodiment, the variable focus imaging lens 1110 can be provided by a deformable imaging lens, e.g., a deformable fluid lens or gel lens. In another embodiment, the variable focus imaging lens 1110 can be provided by a non-deformable fluid lens, e.g., an electrowetting liquid lens wherein the surface tension of one or more volumes of lens liquid changes in response to a signal being applied to the lens, or a liquid crystal type lens wherein indices of refraction of one or more volumes of lens fluid change in response to a signal being applied to the lens.

Mobile computer 100 can further comprise a battery 356. Mobile computer 100 can further comprise a GPS receiver 380 communicatively coupled to system bus 1500 via interface 382. The mobile computer 100 can further comprise at least one connector 390 configured to receive a subscriber identity module (SIM) card, also communicatively coupled to system bus 1500. A skilled artisan would appreciate the fact that mobile computer 100 can comprise various other components, circuits and interfaces.

In some embodiments, the mobile computer 100 can further comprise an embedded encoded information reading (EIR) device 333 communicatively coupled to system bus 1500 via interface 335. EIR device 333 can be provided, for example, by a laser scanning device, an RFID reading device, an NFC reading device, or a magnetic card reading device. The EIR device can be configured to output raw message data containing an encoded message and/or output decoded message data corresponding to the encoded message. As used herein, "message" is intended to denote a byte sequence or a character string comprising alphanumeric and/or non-alphanumeric characters. An encoded message can be used to convey information, such as identification of the source and the model of an item, for example, in an EPC code.

In one illustrative embodiment, the RFID reading device can be compliant with EPC™ Class-1 Generation-2 UHF RFID Protocol for Communications at 860 MHz-960 MHz by EPCglobal, commonly known as the "Gen 2" standard, which defines physical and logical requirements for a passive-backscatter, Interrogator-talks-first (ITF) RFID system operating in the 860 MHz-960 MHz frequency range.

In one illustrative embodiment, the NFC reading device of the EIR terminal can be compliant with *NFC Digital Protocol Technical Specification DIGITAL* 1.0 *NFCForum-TS-DigitalProtocol-*1.0 of 2010-11-17 by NFC Forum™.

Figure 3:
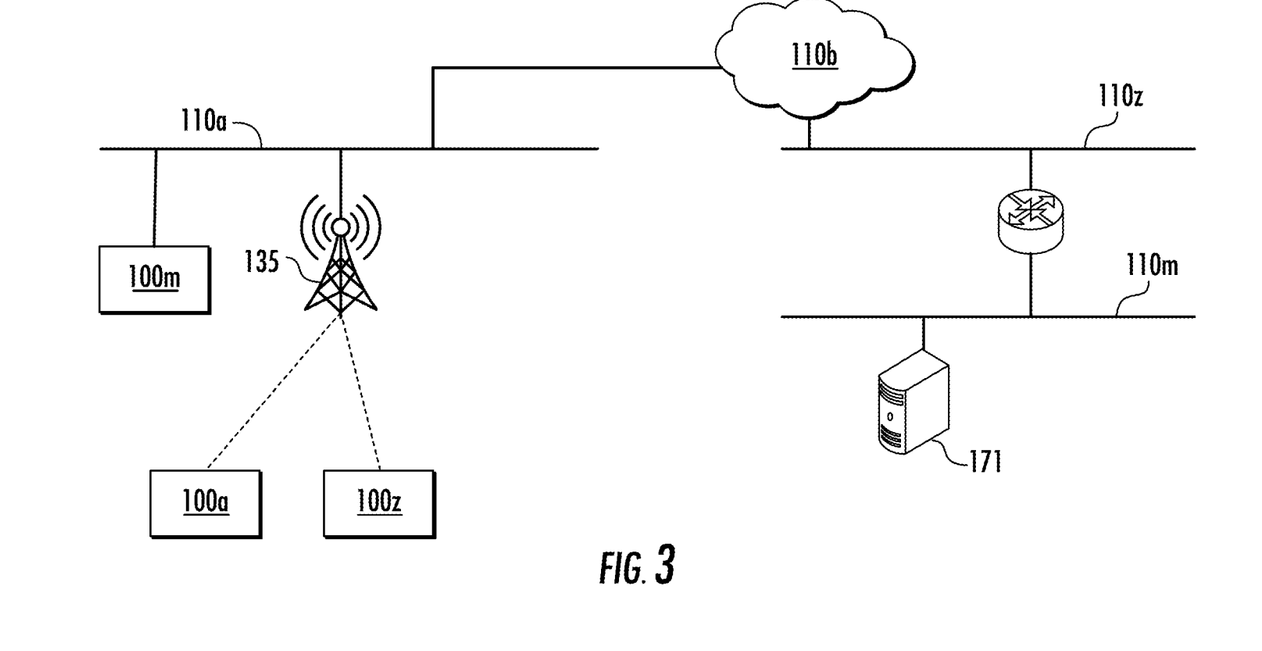
FIG. 3 schematically illustrates a network diagram of one illustrative embodiment of a data collection system employing the mobile computer disclosed herein.

As noted herein supra, mobile computer 100 can transmit, via a wired or wireless communication interface and one or more communication networks, one or more decodable indicia images and/or one or more messages corresponding to successfully decoded decodable indicia to an external computer. As schematically illustrated by FIG. 3, mobile computer 100a-100z can access the external computer 171 over one or more local and/or wide area networks 110a-110z. Mobile computer 100a-100z can connect to one or more networks 110a-110z, e.g., via a wireless access point 135. In one embodiment, at least one of networks 110a-110z can be provided by an IEEE 802.11x-compliant wireless network. In another embodiment, at least one of networks 110a-110z can be provided by an Ethernet network. In another embodiment, at least one of networks 110a-110z can be provided by a local area network (LAN). In another embodiment, at least one of networks 110a-110z can be provided by a wide area network (WAN). While different networks are designated herein, it is recognized that a single network as seen from the network layer of the OSI model can comprise a plurality of lower layer networks, i.e., what can be regarded as a single Internet Protocol (IP) network, can include a plurality of different physical networks.

In a further aspect, the communications between mobile computer 100 and external computer 171 can comprise a series of requests and responses transmitted over one or more TCP connections, although a person skilled in the art would appreciate the fact that using other transport and application level protocols is within the scope of this disclosure. In some embodiments, at least one data frame transmitted by mobile computer 100 to external computer 171 can comprise one or more images of decodable indicia and/or one or more messages corresponding to decodable indicia successfully decoded by mobile computer 100.

Responsive to receiving a decodable indicia image or a decoded message from mobile computer 100, external computer 171 can, in some embodiments, retrieve information corresponding to the decoded message from a database and transmit at least part of the retrieved information to mobile computer 100. In one illustrative embodiment, the decoded message can comprise a retail item identifier, and the information retrieved from the database and transmitted to the mobile computer 100 can comprise the retail item price and/or other characteristics. In another illustrative embodiment, the decoded message can comprise a medical patient identifier, and the information retrieved from the database and transmitted to the mobile computer 100 can comprise patient treatment information.

Figure 4:
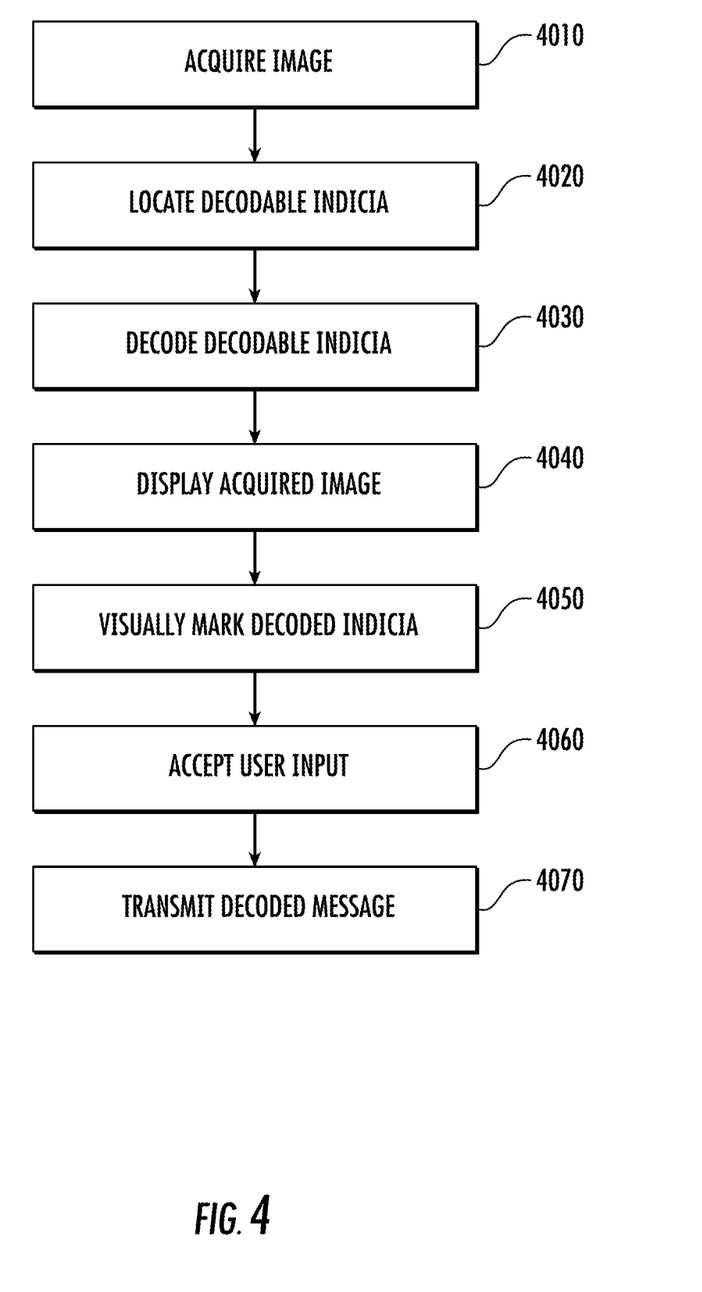
FIG. 4 schematically illustrates one embodiment of a method of processing multiple decodable indicia by mobile computer disclosed herein.

One embodiment of a method of processing multiple decodable indicia by mobile computer is schematically illustrated by the block diagram of FIG. 4. The method can be implemented using one or more processors of one or more computers. In one illustrative embodiment, the method can be implemented using one or more processors of mobile computer 100. Alternatively, the method can be implemented using one or more processors of two or more computers.

At step 4010, mobile computer 100 can acquire an image of one or more objects bearing one or more decodable indicia within the field of view the mobile computer's imaging device.

At step 4020, mobile computer 100 can locate one or more decodable indicia within the acquired image.

At step 4030, mobile computer 100 can decode at least one decodable indicium of the decodable indicia located within the acquired image.

At step 4040, mobile computer 100 can display the acquired image on display 1304.

At step 4050, mobile computer 100 can visually mark the one or more successfully decoded decodable indicia within the displayed image. In one illustrative embodiment, mobile computer 100 can highlight the successfully decoded decodable indicia. Alternatively, mobile computer 100 can draw a bounding box around the successfully decoded decodable indicia. In one illustrative embodiment, a circular dot or some other visual marker can be placed in or around the center of the successfully decoded decodable indicia.

At step 4060, mobile computer 100 can accept the user input selecting at least one decodable indicia of the displayed one or more decodable indicia. In one illustrative embodiment, selecting one or more decodable indicia can be performed via touch screen by the user's tapping the screen areas containing the images of one or more decodable indicia. In another illustrative embodiment, the user's repetitive tapping the screen area containing a decodable indicia image can toggle on or off the inclusion of the indicia and/or a decoded message corresponding to the indicia into the sequence of messages to be transmitted to an external computer.

At step 4070, mobile computer 100 can transmit to an external computer at least one decoded message corresponding to the at least one decodable indicia, and the method can terminate.

In one illustrative embodiment, mobile computer 100 can accept user input indicating which indicia and in which order need to be used by one or more applications. Responsive to accepting the user input selecting two or more decodable indicia, the mobile computer can transmit to an external computer, in the order indicated by the user, the decoded messages corresponding to the selected indicia, and the method can terminate.

In another aspect, there is provided a computer-readable storage medium comprising executable instructions capable of configuring one or more processors for implementing the above described method.

A small sample of systems, methods, and apparata that are described herein is as follows:

A1. A device comprising: a processor; a memory; an imaging subsystem configured to acquire an image of decodable indicia; a display; a communication interface; wherein said device is configured, responsive to acquiring an image of one or more objects within a field of view of said imaging subsystem, to locate within said image and decode one or more decodable indicia; wherein said device is further configured to display said image on said display and visually mark said one or more successfully decoded decodable indicia; and wherein said device is further configured, responsive to accepting user input selecting at least one decodable indicia of said displayed one or more decodable indicia, to transmit to an external computer at least one decoded message corresponding to said at least one decodable indicia. A2. The device of (A1), wherein said device is provided by one of: a smart phone, a tablet computer, and a personal digital assistant. A3. The device of (A1), wherein said imaging subsystem comprises: a two-dimensional image sensor configured to output an analog signal representative of light reflected by an object located within a field of view of said imaging subsystem; an amplifier configured to output an amplified analog signal by amplifying said analog signal read out of said image sensor; and an analog-to-digital (A/D) converter configured to convert said amplified analog signal into a digital signal representing said acquired image. A4. The device of (A1), further configured to accept user input indicating an order in which decoded messages corresponding to two or more decodable indicia are to be transmitted to said external computer. A5. The device of (A1), further configured to accept user input selecting within said displayed image at least one decodable indicia which is not marked as successfully decoded; wherein said device is further configured to decode said at least one decodable indicia. A6. The device of (A1), further configured, responsive to accepting user input selecting at least one decodable indicia of said displayed one or more decodable indicia, to transmit to an external computer at least one image comprising said at least one decodable indicia.

B1. A method, performed using one or more processors, comprising: acquiring, using at least one processor of said one or more processors, an image of one or more objects bearing one or more decodable indicia; locating, using at least one processor of said one or more processors, one or more decodable indicia within said image; decoding, using at least one processor of said one or more processors, said one or more decodable indicia; displaying, using at least one processor of said one or more processors, said image; visually marking, using at least one processor of said one or more processors, said one or more successfully decoded decodable indicia within said displayed image; accepting, using at least one processor of said one or more processors, user input selecting at least one decodable indicia of said displayed one or more decodable indicia; and transmitting, using at least one processor of said one or more processors, to an external computer at least one decoded message corresponding to said at least one decodable indicia. B2. The method of (B1), wherein said at least one decodable indicia of said displayed one or more decodable indicia is provided by two or more decodable indicia; and wherein said step of accepting user input comprises accepting user input indicating an order in which decoded messages corresponding to said two or more decodable indicia are to be transmitted to said external computer. B3. The method of (B1), further comprising: accepting user input selecting within said displayed image at least one decodable indicia which is not marked as successfully decoded; and decoding said at least one decodable indicia. B4. The method of (B1), wherein said visually marking said one or more successfully decoded decodable indicia within said displayed image is performed by highlighting said one or more successfully decoded decodable indicia. B5. The method of (B1), wherein said visually marking said one or more successfully decoded decodable indicia within said displayed image is performed by rendering a bounding box around said one or more successfully decoded decodable indicia. B6. The method of (B1), wherein said visually marking said one or more successfully decoded decodable indicia within said displayed image is performed by rendering a visual marker around a center of said one or more successfully decoded decodable indicia. B7. The method of (B1), further comprising: transmitting, responsive to accepting user input selecting at least one decodable indicia of said displayed one or more decodable indicia, to an external computer at least one image comprising said at least one decodable indicia. B8. The method of (B1), wherein said method is performed by one or more processors of one or more mobile computers.

C1. A computer-readable storage medium comprising executable instructions capable of configuring one or more processors for: acquiring, using at least one processor of said one or more processors, an image of one or more objects bearing one or more decodable indicia; locating, using at least one processor of said one or more processors, one or more decodable indicia within said image; decoding, using at least one processor of said one or more processors, said one or more decodable indicia; displaying, using at least one processor of said one or more processors, said image; visually marking, using at least one processor of said one or more processors, said one or more successfully decoded decodable indicia within said displayed image; accepting, using at least one processor of said one or more processors, user input selecting at least one decodable indicia of said displayed one or more decodable indicia; and transmitting, using at least one processor of said one or more processors, to an external computer at least one decoded message corresponding to said at least one decodable indicia. C2. The computer-readable storage medium of (C1), in which the executable instructions are further capable of configuring one or more processors so that: said step of accepting user input comprises accepting user input indicating an order in which decoded messages corresponding to said two or more decodable indicia are to be transmitted to said external computer. C3. The computer-readable storage medium of (C1), in which the executable instructions are further capable of configuring one or more processors for: selecting within said displayed image at least one decodable indicia which is not marked as successfully decoded; and decoding said at least one decodable indicia. C4. The computer-readable storage medium of (C1), in which the executable instructions are further capable of configuring one or more processors so that: said visually marking said one or more successfully decoded decodable indicia within said displayed image is performed by highlighting said one or more successfully decoded decodable indicia. C5. The computer-readable storage medium of (C1), in which the executable instructions are further capable of configuring one or more processors so that: said visually marking said one or more successfully decoded decodable indicia within said displayed image is performed by rendering a bounding box around said one or more successfully decoded decodable indicia C6. The computer-readable storage medium of (C1), in which the executable instructions are further capable of configuring one or more processors so that: said visually marking said one or more successfully decoded decodable indicia within said displayed image is performed by rendering a visual marker around a center of said one or more successfully decoded decodable indicia.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:

1. A device, comprising:
   an imaging subsystem having a field of view and configured to acquire an image;
   a display; and
   a communication interface;
   wherein the device is configured to:
      display an image of an object within the field of view of the imaging subsystem on the display;
      locate within the acquired image one or more decodable indicia;
      decode the one or more of the located decodable indicia;
      visually mark one or more successfully decoded decodable indicia on the display;
      accept user input selecting one of the successfully decoded decodable indicia in the displayed image; and
      transmit, with the communication interface, to an external computer the decoded message corresponding to the selected decodable indicia.

2. The device of claim 1, wherein the device is a smart phone, a tablet computer, and/or a personal digital assistant.

3. The device of claim 1, wherein the imaging subsystem comprises:
   a two-dimensional image sensor configured to output an analog signal representative of light reflected by an object located within the field of view of the imaging subsystem;
   an amplifier configured to output an amplified analog signal by amplifying the analog signal read out of the image sensor; and
   an analog-to-digital (A/D) converter configured to convert the amplified analog signal into a digital signal representing the acquired image.

4. The device of claim 1, wherein the device is configured to accept user input indicating an order in which decoded messages corresponding to two or more decodable indicia are to be transmitted to the external computer.

5. The device of claim 1, wherein the device is configured to:
   accept user input selecting within the displayed image at least one decodable indicia which is not marked as successfully decoded; and
   decode the selected at least one decodable indicia.

6. The device of claim 1, wherein the device is configured to transmit, with the communication interface, to an external computer at least one image comprising the selected decodable indicia.

7. A method, comprising:
   displaying, with an imaging subsystem, an image of an object within a field of view of the imaging subsystem on a display;
   locating, with a device comprising the imaging subsystem, within the acquired image one or more decodable indicia;
   decoding, with the device, the one or more of the located decodable indicia;
   visually marking, with the device, one or more successfully decoded decodable indicia within the displayed image;
   accepting, with the device, user input selecting one of the successfully decoded decodable indicia in the displayed image; and
   transmitting, with the device, to an external computer the decoded message corresponding to the selected decodable indicia.

8. The method of claim 7, comprising:
   displaying, with the device, two or more decodable indicia in the acquired image on the display;
   accepting, with the device, user input indicating an order in which decoded messages corresponding to the displayed two or more decodable indicia are to be transmitted to the external computer.

9. The method of claim 7, comprising:
   accepting user input selecting within the displayed image at least one decodable indicia which is not marked as successfully decoded; and
   decoding the selected at least one decodable indicia.

10. The method of claim 7, wherein visually marking, with the device, one or more successfully decoded decodable indicia within the displayed image comprises highlighting the one or more successfully decoded decodable indicia within the displayed image.

11. The method of claim 7, wherein visually marking, with the device, one or more successfully decoded decodable indicia within the displayed image comprises rendering a bounding box around the one or more successfully decoded decodable indicia within the displayed image.

12. The method of claim 7, wherein visually marking, with the device, one or more successfully decoded decodable indicia within the displayed image comprises rendering a visual marker around a center of the one or more successfully decoded decodable indicia within the displayed image.

13. The method of claim 7, comprising transmitting with the communication interface, to an external computer at least one image comprising the selected decodable indicia.

14. The method of claim 7, wherein the device comprises a mobile computer.

15. A computer-readable storage medium comprising executable instructions capable of configuring one or more processors for:
   displaying, with an imaging subsystem, an image of an object within a field of view of the imaging subsystem on a display;

locating, with a device comprising the imaging subsystem, within the acquired image one or more decodable indicia;

decoding, with the device, the one or more of the located decodable indicia;

visually marking, with the device, one or more successfully decoded decodable indicia within the displayed image;

accepting, with the device, user input selecting one of the successfully decoded decodable indicia in the displayed image; and transmitting, with the device, to an external computer the decoded message corresponding to the selected decodable indicia.

16. The computer-readable storage medium of claim 15, in which the executable instructions are capable of configuring one or more processors for:

displaying, with the device, two or more decodable indicia in the acquired image on the display;

accepting, with the device, user input indicating an order in which decoded messages corresponding to the displayed two or more decodable indicia are to be transmitted to the external computer.

17. The computer-readable storage medium of claim 15, in which the executable instructions are capable of configuring one or more processors for:

accepting user input selecting within the displayed image at least one decodable indicia which is not marked as successfully decoded; and decoding the selected decodable indicia.

18. The computer-readable storage medium of claim 15, wherein visually marking, with the device, one or more successfully decoded decodable indicia within the displayed image comprises highlighting the one or more successfully decoded decodable indicia within the displayed image.

19. The computer-readable storage medium of claim 15, wherein visually marking, with the device, one or more successfully decoded decodable indicia within the displayed image comprises rendering a bounding box around the one or more successfully decoded decodable indicia within the displayed image.

20. The computer-readable storage medium of claim 15, wherein visually marking, with the device, one or more successfully decoded decodable indicia within the displayed image comprises rendering a visual marker around a center of the one or more successfully decoded decodable indicia within the displayed image.

* * * * *